(12) United States Patent
Shah

(10) Patent No.: US 9,567,867 B2
(45) Date of Patent: Feb. 14, 2017

(54) METHODS AND APPARATUS FOR DEPLOYABLE SWIRL VANES

(75) Inventor: Parthiv N. Shah, San Diego, CA (US)

(73) Assignee: ATA ENGINEERING, INC., San Diego, CA (US)

( * ) Notice: Subject to any disclaimer, the term of this patent is extended or adjusted under 35 U.S.C. 154(b) by 1386 days.

(21) Appl. No.: 13/618,733

(22) Filed: Sep. 14, 2012

(65) Prior Publication Data

US 2013/0202404 A1 Aug. 8, 2013

Related U.S. Application Data

(60) Provisional application No. 61/534,733, filed on Sep. 14, 2011.

(51) Int. Cl.
*F01D 17/10* (2006.01)
*F02K 1/42* (2006.01)

(52) U.S. Cl.
CPC .............. *F01D 17/10* (2013.01); *F02K 1/42* (2013.01)

(58) Field of Classification Search
CPC .............. F02K 1/66; F02K 1/42; F02K 1/383; F02K 1/70; F02K 1/12; F02K 1/64; F02K 1/002; F02K 1/386; F02K 1/827; F02K 3/075; F02K 3/025; F02K 3/04; B64D 33/04; F01D 17/10
See application file for complete search history.

(56) References Cited

U.S. PATENT DOCUMENTS

| | | | |
|---|---|---|---|
| 2,504,422 A | 4/1950 | Johnson et al. | |
| 2,709,054 A | 5/1955 | Roth | |
| 3,618,700 A | * 11/1971 | Bond | F02K 1/827 |
| | | | 181/219 |
| 4,203,285 A | 5/1980 | Hanloser et al. | |
| 4,382,569 A | 5/1983 | Boppe et al. | |
| 4,917,332 A | 4/1990 | Patterson, Jr. | |
| 5,100,085 A | 3/1992 | Rubbert | |
| 5,102,068 A | 4/1992 | Gratzer | |
| 5,150,859 A | 9/1992 | Ransick | |
| 5,228,641 A | 7/1993 | Remlaoui | |
| 5,259,187 A | 11/1993 | Dunbar et al. | |
| 5,294,080 A | 3/1994 | Ross | |
| 5,315,821 A | 5/1994 | Dunbar et al. | |
| 5,467,941 A | 11/1995 | Chee | |
| 5,592,813 A | 1/1997 | Webb | |

(Continued)

OTHER PUBLICATIONS

Steven X.S. Bauer, An Aerodynamic Assessment of Micro-Drag Generators (MDGs), American Institute of Astronautics and Aeronautics, 1998, pp. 1-11, US.

(Continued)

*Primary Examiner* — Andrew Nguyen
(74) *Attorney, Agent, or Firm* — Ingrassia Fisher & Lorenz, P.C.

(57) ABSTRACT

An aircraft control structure for drag management includes a nozzle structure configured to exhaust a swirling fluid stream. A plurality of swirl vanes are positioned within the nozzle structure, and an actuation subsystem is configured to cause the plurality of swirl vanes to move from a deployed state to a non-deployed state. In the non-deployed state, the plurality of swirl vanes are substantially flush with the inner surface of the nozzle structure. In the deployed state, the plurality of swirl vanes produce the swirling fluid stream.

11 Claims, 9 Drawing Sheets

(56) References Cited

U.S. PATENT DOCUMENTS

| | | |
|---|---|---|
| 5,702,071 A | 12/1997 | Kroll et al. |
| 5,735,485 A | 4/1998 | Ciprian et al. |
| 5,791,875 A | 8/1998 | Ngo |
| 5,794,432 A | 8/1998 | Dunbar et al. |
| 5,904,320 A | 5/1999 | Tindell |
| 5,934,612 A | 8/1999 | Gerhardt |
| 6,131,853 A | 10/2000 | Bauer et al. |
| 6,260,809 B1 | 7/2001 | Egolf et al. |
| 6,292,763 B1 | 9/2001 | Dunbar et al. |
| 6,474,604 B1 | 11/2002 | Carlow |
| 6,817,573 B2 | 11/2004 | Harrison et al. |
| 6,845,607 B2 | 1/2005 | Lair |
| 6,886,778 B2 | 5/2005 | McLean |
| 6,892,988 B2 | 5/2005 | Hugues |
| 6,948,910 B2 | 9/2005 | Polacsek |
| 7,104,251 B2 | 9/2006 | Kim |
| 7,111,448 B2 | 9/2006 | Anderson |
| 7,134,631 B2 | 11/2006 | Loth |
| 7,207,526 B2 | 4/2007 | McCarthy |
| 7,216,831 B2* | 5/2007 | Wood ............... 244/99.8 |
| 7,588,415 B2 | 9/2009 | Giaimo et al. |
| 2004/0031258 A1* | 2/2004 | Papamoschou ........ F02K 1/42 60/204 |
| 2005/0184196 A1 | 8/2005 | Shmilovich et al. |
| 2005/0279081 A1 | 12/2005 | Lardellier |
| 2006/0000211 A1* | 1/2006 | Webster ............... 60/527 |
| 2006/0022092 A1 | 2/2006 | Miller et al. |
| 2006/0266882 A1 | 11/2006 | Kummer et al. |
| 2007/0041823 A1 | 2/2007 | Miller |
| 2007/0163230 A1* | 7/2007 | Dussillols ............ F02K 1/36 60/262 |
| 2007/0170313 A1 | 7/2007 | Delaplace |
| 2008/0022651 A1 | 1/2008 | Papamoschou |
| 2010/0018213 A1* | 1/2010 | Migliaro, Jr. ......... F02K 1/06 60/771 |
| 2010/0254803 A1 | 10/2010 | Papamoschou |

OTHER PUBLICATIONS

Antonio Filippone, Steep-Descent Maneuver of Transport Aircraft, Journal of Aircraft, Sep. 2007, pp. 1727-1739, vol. 44, No. 5.
Parthiv N. Shah, Aeroacoustics of Swirling Exhaust Flows in High Bypass Ratio Turbofan Nozzles for Drag Management Applications, 17th AIAA/CEAS Aeroacustics Conference, Jun. 2011, pp. 1-15, Portland, Oregon, US.
P. Shah, et al., Drag Management in High Bypass Turbofan Nozzles for Quiet Approach Applications, Proceedings of ASME Turbo Expo 2011, Jun. 2011, 1-15, Vancouver, BC, CA.
P.N. Shah, Engine Brakes for Quiet Air Transport, 45th Aerospace Sciences Meeting and Exhibit, Jan. 2007, Reno, NV.
P.N. Shah, et al., Aeroacoustics of Drag-Generating Swirling Exhaust Flows, AIAA Jornal, vol. 48, No. 4, Apr. 2010, pp. 719-727.
P.N. Shah, et al., a Novel Turbomachinery Air-Brake Concept for Quiet Aircraft, Journal of Turbomachinery, vol. 132, Oct. 2010, pp. 041002-1-041002-11.
Parthiv N. Shah, Novel Turbomachinery Concepts for Highly Integrated Airframe/Propulsion Systems, Thesis, Massachusetts Institute of Technology, Oct. 4, 2006.

* cited by examiner

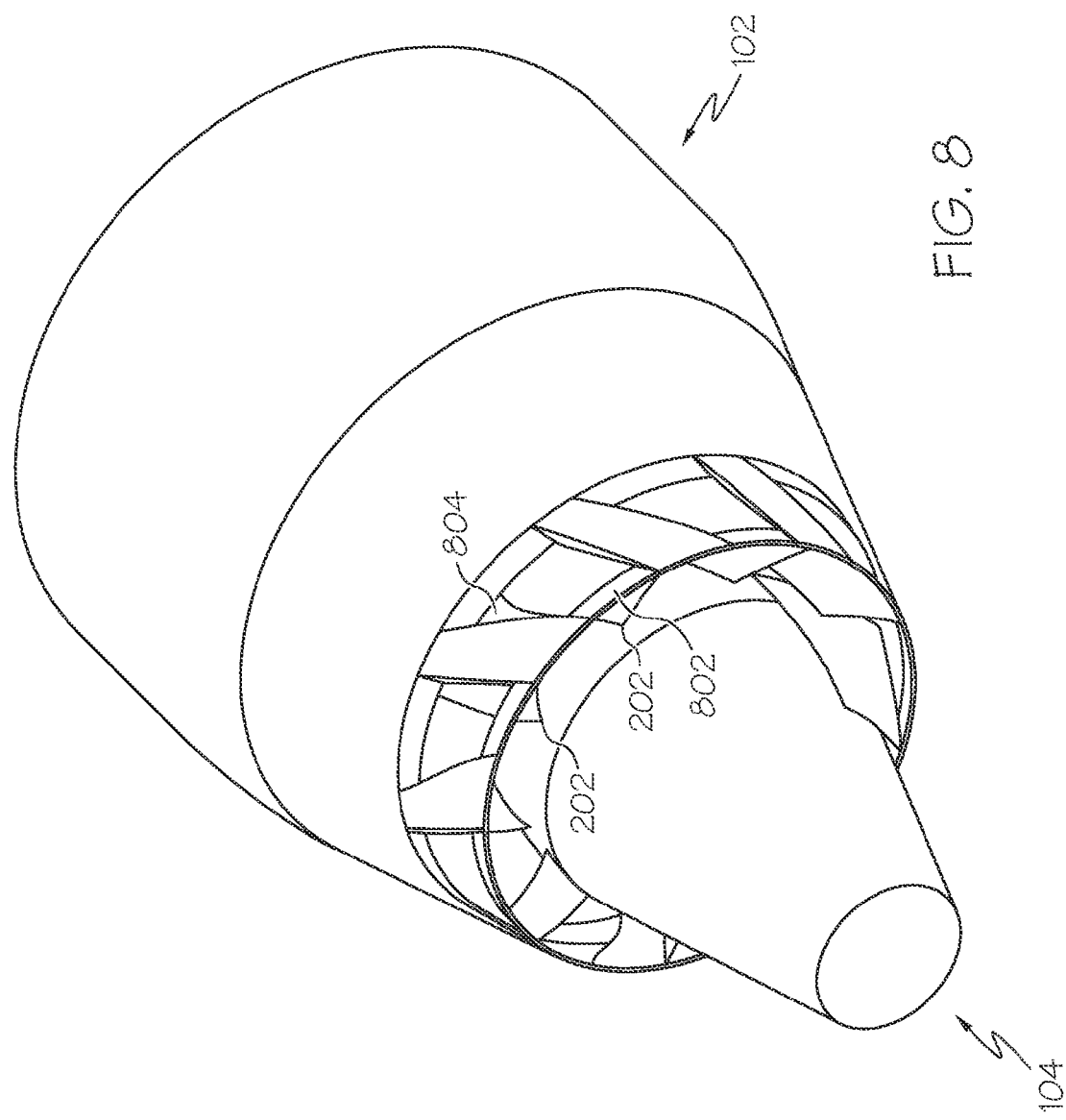

METHODS AND APPARATUS FOR DEPLOYABLE SWIRL VANES

CROSS-REFERENCE TO RELATED APPLICATION

This application claims the benefit of U.S. Provisional Patent Application Ser. No. 61/534,733, filed Sep. 14, 2011, the entire contents of which are incorporated by reference herein.

STATEMENT REGARDING FEDERALLY SPONSORED RESEARCH OR DEVELOPMENT

This invention was made with U.S. Government support under contract number NNX09CA33C awarded by the National Aeronautics and Space Administration (NASA). The U.S. Government has certain rights in the invention.

TECHNICAL FIELD

Embodiments of the subject matter described herein relate generally to aircraft structures and subsystems. More particularly, embodiments of the subject matter relate to drag management systems used in connection with turbofan aircraft engines.

BACKGROUND

Current and future aircraft are expected to operate more economically than their predecessors under more stringent environmental and airspace constraints. Aircraft engine-integrated drag management technologies have been identified as one way to achieve future operational improvements, such as lower-noise approaches that benefit from reduced engine thrust on approach and descent.

Conventional systems for managing aircraft drag are unsatisfactory in a number of respects. For example, airframe drag generating components are often noisy and place the aircraft in an aerodynamic configuration that requires relatively high engine idle inertia to enable emergency procedures where rapid acceleration is required.

Generation of swirling outflow from the engine's exhaust has the potential to deliver equivalent drag at a given engine operating condition without the need for such noisy airframe-based components. However, technologies to generate such swirl require structures configured to partially redirect the stream of fluid exiting the nozzle of the turbofan engine in a manner that can rapidly and reliably return the engine to a high thrust mode when necessary.

Commonly known components used in such systems—e.g., turning vanes and other such structures—are not stowable in a manner that is optimal. That is, even when not deployed, the geometry and placement of such swirl vanes and other structures can change the flow path of fluids within the turbofan engine, resulting in a drag penalty for the aircraft when in a cruise configuration. Additionally, conventional turning vanes may reduce nozzle flow capacity, resulting in a potentially adverse back pressuring of the engine's pumping system.

BRIEF SUMMARY

An exemplary embodiment of an aircraft control structure comprises: a nozzle structure configured to exhaust a swirling fluid stream, the nozzle structure having an inner surface; a plurality of swirl vanes positioned within the nozzle assembly; and an actuation subsystem configured to cause the plurality of swirl vanes to move from a deployed state to a non-deployed state; wherein, while in the non-deployed state, the plurality of swirl vanes are substantially flush with the inner surface of the nozzle assembly; and wherein, while in the deployed state, the plurality of swirl vanes produce the swirling fluid stream.

An exemplary embodiment of a drag management system for an aircraft having a turbofan engine comprises a plurality of swirl vanes provided within the nozzle assembly, the plurality of swirl vanes having a deployed state and a non-deployed state; and an actuation subsystem mechanically coupled to the plurality of swirl vanes and configured to move the plurality of swirl vanes from the non-deployed state to the deployed state; wherein the plurality of swirl vanes are configured to seat substantially flush with an inner surface of the nozzle structure when in the non-deployed state.

An exemplary method of providing drag management for a turbofan engine having a nozzle structure includes: providing a plurality of swirl vanes within the nozzle structure such that, while in a non-deployed state, the plurality of swirl vanes are substantially flush with an inner surface of the nozzle assembly; and causing the plurality of swirl vanes to move from the non-deployed state to a deployed state such that the plurality of swirl vanes produce a swirling fluid stream.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 8 is an isometric cut-away view of a nozzle geometry in accordance with an alternate embodiment;

DETAILED DESCRIPTION

Figure 1:
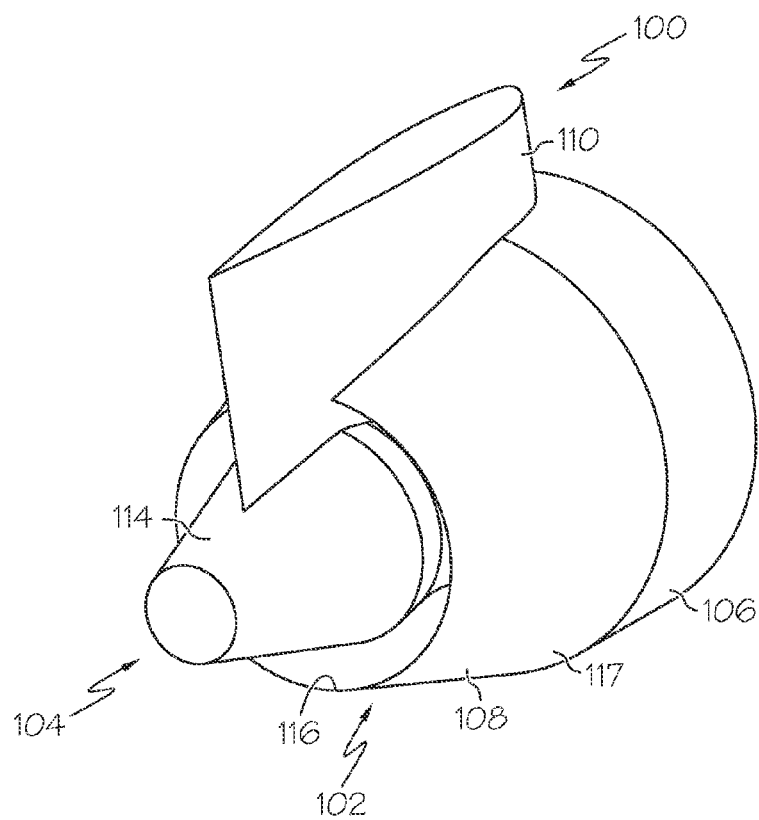
FIG. 1 is a simplified perspective view of a nozzle geometry typical of a high-bypass ratio turbofan engine.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

In addition, certain terminology may also be used in the following description for the purpose of reference only, and thus are not intended to be limiting. For example, terms such as "upper", "lower", "above", and "below" may refer to directions in the drawings to which reference is made. Terms such as "aft", "fore", "front", "back", "rear", "side", "outboard", and "inboard" may be used to describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Various exemplary embodiments presented herein relate to the use of deployable swirl vane structures in turbofan propulsion engines as part of an engine air brake (EAB) system, and more generally an aircraft drag management system and/or an aircraft flight control system. In general, the techniques and technology described here are based on locally redirecting a stream of air out of a nozzle of a turbofan engine, such as the bypass nozzle. In one embodiment, a plurality of swirl vanes are incorporated into the inner wall of the nozzle such that they remain substantially flush with the inner surface of the nozzle when in a non-deployed (i.e., "stowed") state, and can be rotated to a deployed state with the use of a convenient actuation subsystem.

FIG. 1 is a simplified perspective view of a typical turbofan engine with a dual-stream separate flow nozzle configuration (or simply "separate-flow" engine) 100 as it might be configured under the wing of an aircraft (not shown). It will be appreciated that such a structure might also be mounted, mutatis mutandis, to the fuselage or other such structure of an aircraft. Regardless of the particular mounting method, engine assembly 100 generally includes an outer nozzle structure 102 and an inner nozzle structure 104. In this embodiment, outer nozzle structure 102 is defined by a generally tubular nacelle region 106 and a tapered exit end region 108. Inner nozzle structure 104 has an outer surface 114, and outer nozzle structure 102 includes an inner surface 116 in tapered exit end region 108 as well as an outer surface 117. While the present application is described in the context of a turbofan engine, it will be appreciated that the present invention may also be used in connection with other generally tubular structures carrying an internal fluid flow in which a swirling flow is desired in a deployable manner; e.g., to increase mixing or introduce a strong radial pressure gradient.

It will be appreciated that both outer surface 114 of inner nozzle structure 104 and inner surface 116 of outer nozzle structure 102 are wetted by an internal fluid flow, and thus may be referred to as "internally wetted surfaces." In accordance with alternate embodiments of the invention, the deployable swirl vanes are generally flush with any of the internally wetted surfaces within engine 100, such as surfaces 114 and 116.

Inner nozzle structure 104 may also be referred to as a "core nozzle," and the opening between the inner nozzle structure 104 and outer nozzle 102 defines what may be referred to as a "bypass nozzle." Nozzle structures 102 and 104 may collectively be referred to as the "nozzle assembly" of the aircraft. Turbofan engine 100 may be mounted to an aircraft via a structure such as a pylon 110, which includes the necessary structural load transferring hardware in addition to any aerodynamic fairing surfaces used to smoothly direct fluid from the ambient atmosphere or either or both of the turbofan engine streams. It will be appreciated that outer nozzle structure 102 may have a variety of shapes, and is not limited to the particular nacelle and exit end region design depicted in the drawing.

Figure 2A:
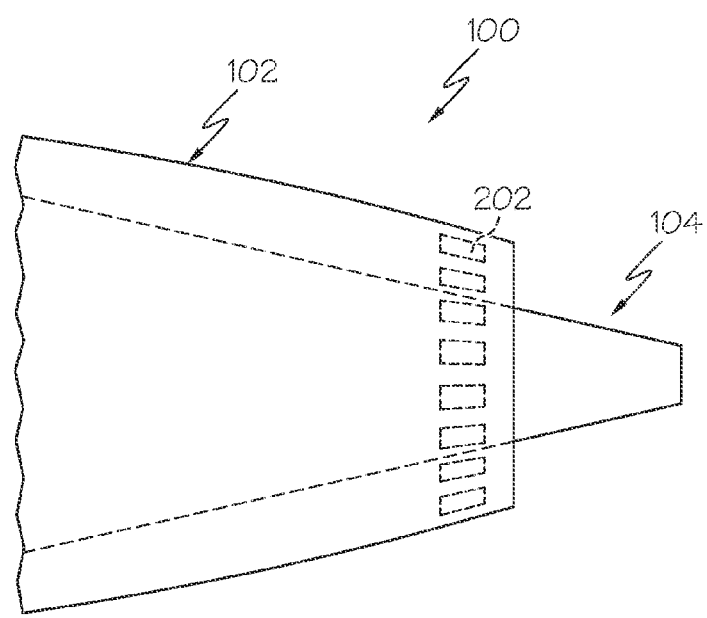
FIG. 2A is a schematic side view of a separate-flow nozzle geometry in accordance with one embodiment.
Figure 5:
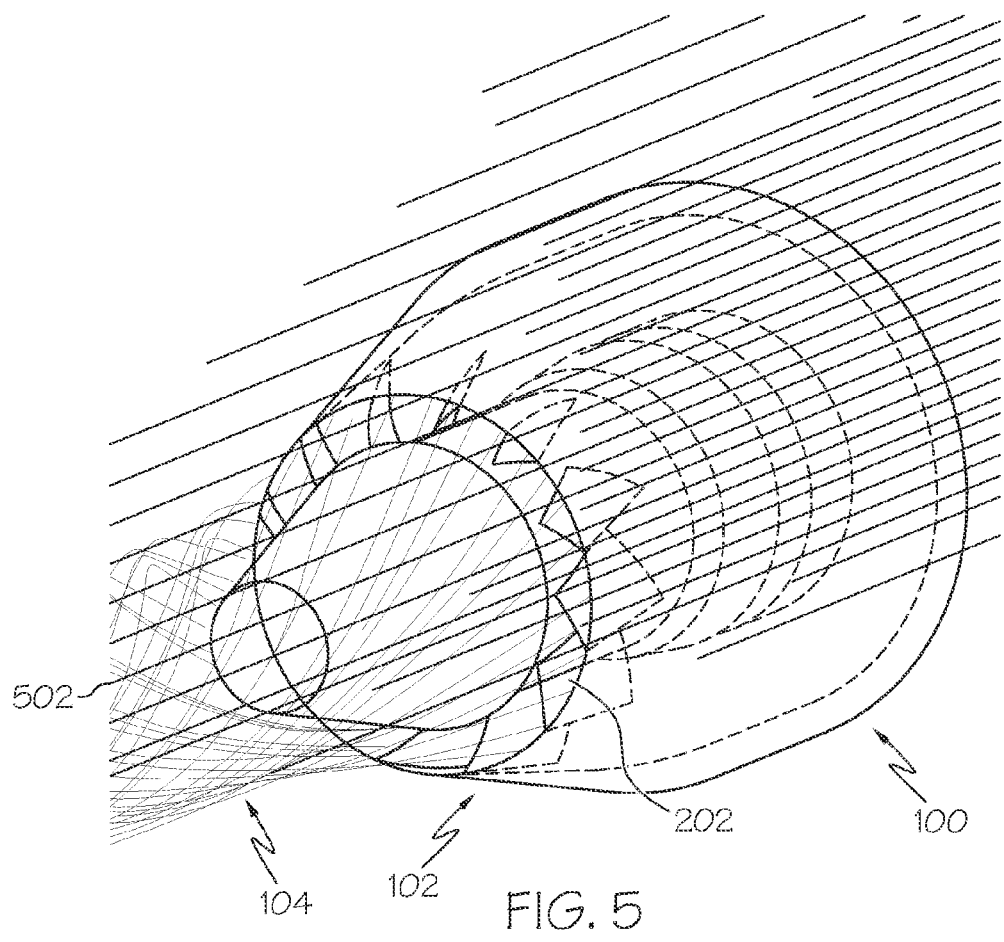
FIG. 5 is a diagram that illustrates a swirling outflow in the presence of deployed swirl vanes in accordance with one embodiment.

As shown in the partially transparent side view of FIG. 2A, engine 100 (in this embodiment, a separate-flow turbofan engine) includes a plurality of deployable swirl vanes (or simply "swirl vanes") 202 positioned within outer nozzle structure 102 and configured to produce a swirling fluid stream exiting engine 100. Swirl vanes 202 are arranged in an annular configuration within the interior of outer nozzle structure 102. To promote a swirling flow of the bypass stream, swirl vanes 202 are tilted, pitched, cambered, or otherwise angled (and/or shaped) relative to the fore-aft (longitudinal) axis of the engine assembly 100. Referring briefly to FIG. 5, for example, the swirl vanes 202 as illustrated in this partial cut-away-view are pitched in a direction that creates a clockwise swirl as seen in an aft-looking-forward (ALF) view, as represented by streamlines 502. It should be appreciated that the number, size, pitch, distribution and/or shape of swirl vanes 202 as well as any other characteristics and parameters associated with the swirl vanes 202 may vary from one embodiment to another, as described in further detail below.

Figure 2B:
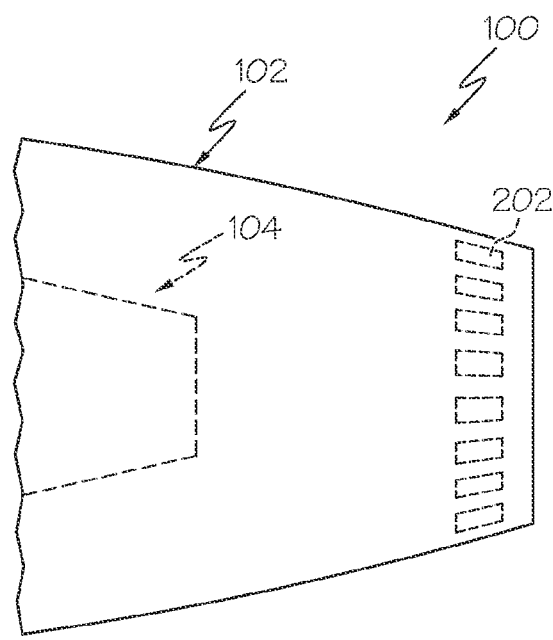
FIG. 2B is a schematic side view of a mixed-flow nozzle geometry in accordance with one embodiment.

While FIG. 2A depicts a common "separate-flow" turbofan engine, the invention is not so limited. As shown in FIG. 2B, for example, a "mixed-flow" turbofan engine might also employ a plurality of deployable swirl vanes 202. In this embodiment, inner nozzle structure 104 terminates well within the volume defined by exterior nozzle structure 102, thereby mixing their resulting flows. The shape of the dotted line indicating inner nozzle structure 104 is not intended to be limiting, and may include a variety of shapes and additional components, such as mixing enhancement features.

As used herein, swirl vanes 202 are "deployable" in the sense that they have a non-deployed (or "stowed" state) and at least one deployed state in which they function to provide a swirling fluid stream as mentioned above. As described in further detail below, the position and/or pitch of swirl vanes 202 (individually or collectively) can be adjusted and controlled by a suitably configured onboard control system and actuation subsystem for purposes of drag management, noise reduction, aircraft flight control, and/or the like.

Figure 3:
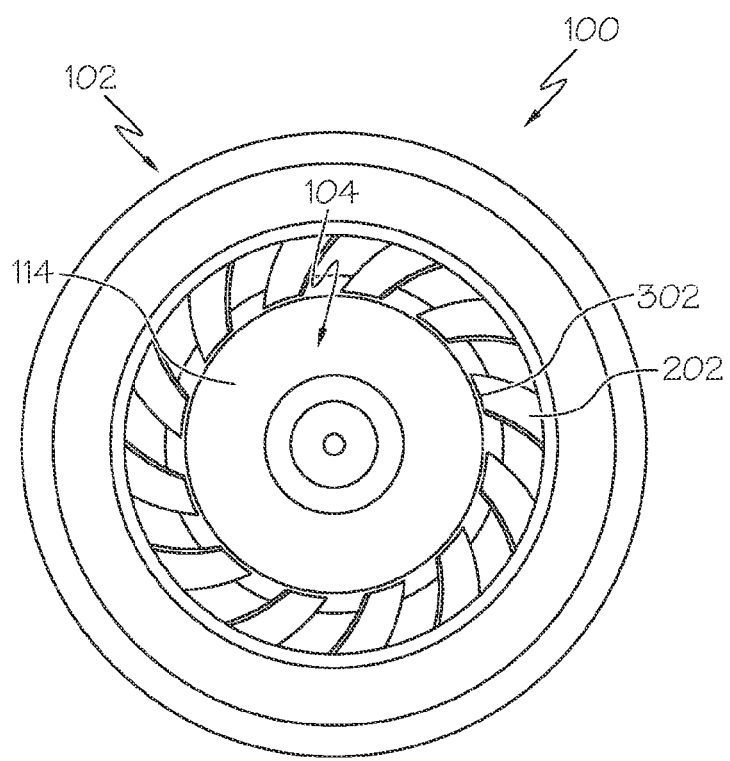
FIG. 3 is a aft-looking-forward (ALF) view of a nozzle geometry with deployed swirl vanes in accordance with one embodiment.
Figure 4:
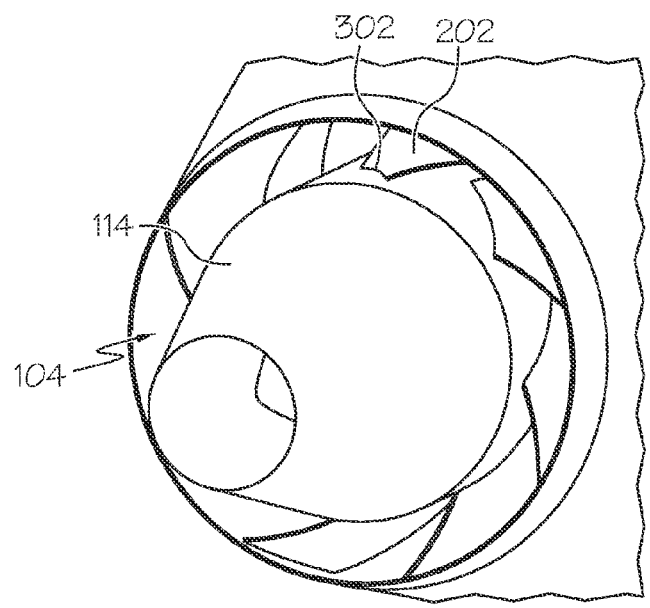
FIG. 4 is an isometric view of the nozzle geometry depicted in FIG. 3.

FIGS. 3 and 4 respectively depict an ALF view and an isometric view of a separate-flow nozzle geometry in accordance with one embodiment in which the swirl vanes 202 have been deployed. In this embodiment, in the deployed state, swirl vanes 202 are configured to contact outer surface 114 of inner nozzle structure 104. The area of contact (indicated by reference numeral 302) will generally vary depending upon the geometry and size of both swirl vanes 202 and inner nozzle structure 104. In one embodiment, however, the inboard surface of each swirl vane 202 is contoured to conform to the shape of the inner nozzle. This embodiment is advantageous in that it provides added stability for swirl vanes 202 and the wall effectively formed by the inner nozzle 104 will inhibit the leakage of fluid around the tips of swirl vanes 202. In a mixed-flow embodiment such as that shown in FIG. 2B, however, the swirl vanes 202 are not likely to be configured to contact the inner nozzle structure 104. In such a case, swirl vanes 202 are "cantilevered" into the flow.

Figure 6:
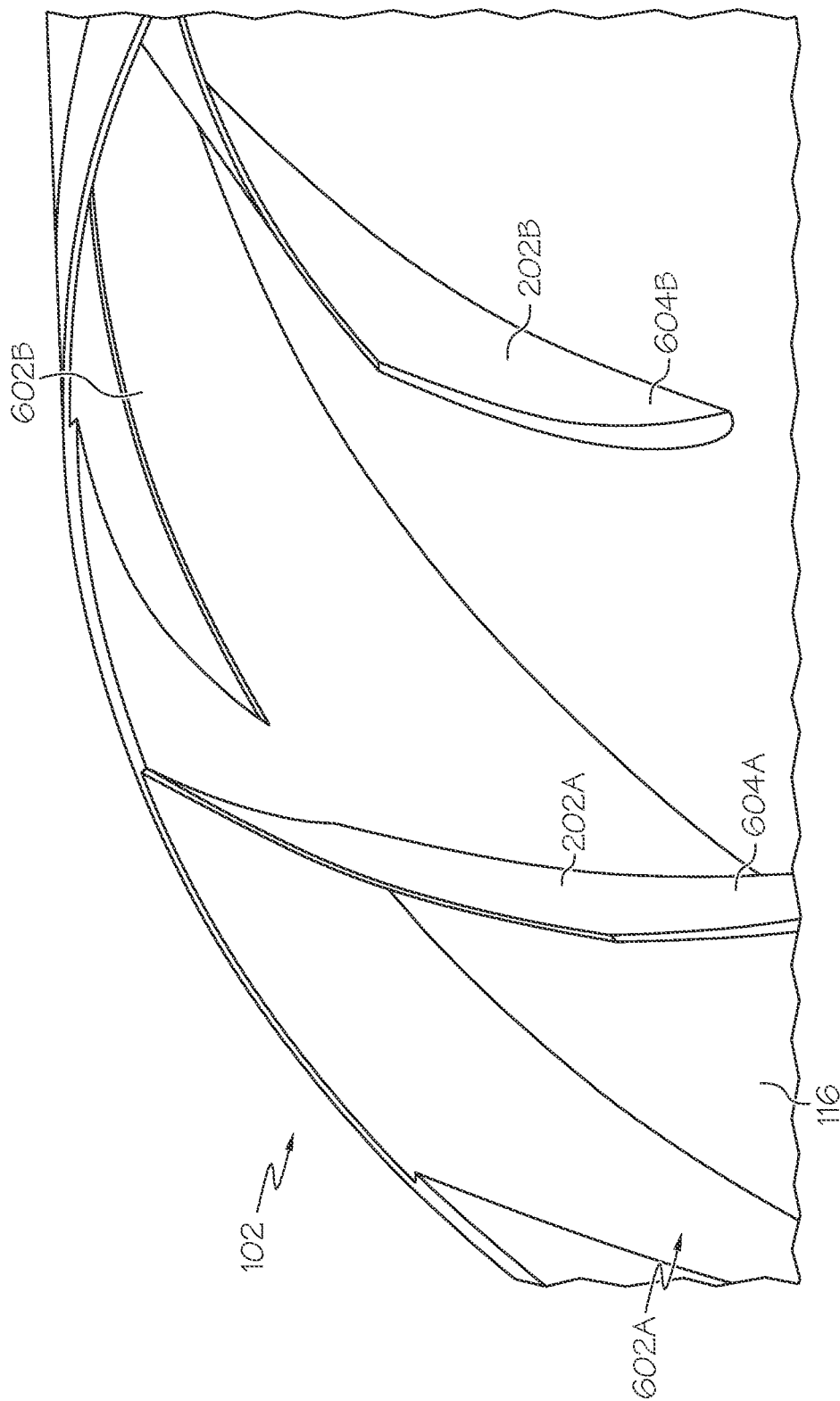
FIG. 6 is an isometric close-up of deployable swirl vanes provided within the inner surface of a nozzle in accordance with one embodiment.

In accordance with one embodiment, swirl vanes 202 are configured such they fit within and/or are substantially flush with (i.e., "seat within") a region of the inner surface 116 of outer nozzle structure 102. In this regard, FIG. 6 illustrates an isometric close-up view of an area around the edge of outer nozzle structure 102. In this view, two adjacent swirl vanes are shown: swirl vane 202A and swirl vane 202B. Both swirl vanes 202A and 202B are illustrated in an equivalent deployed state (though the invention is not so limited) and hingedly connected to outer nozzle structure 102.

Along the inner surface 116 are shown two corresponding recesses or "pockets" 602A and 602B configured to respectively receive swirl vanes 202A and 202B when the swirl vanes are in their non-deployed state. The recesses 602 are preferably smooth and aerodynamically benign. For example, the edges of swirl vanes 202 may be configured to be relatively sharp so that there are no significant aerodynamic steps in the flow-path within outer nozzle structure 102 when the swirl vanes 202 are in the deployed state.

Furthermore, when swirl vanes 202A and 202B are in their non-deployed state, it is desirable that their respective surfaces 604A and 604B substantially conform to the shape of inner surface 116 in regions 602A and 602B. Thus, the swirl vane shapes takes advantage of the inherent curvature of the turbofan nozzle and are cleanly stowed within their respective pockets, thereby avoiding a drag penalty while in an aircraft cruise configuration. Thus, the term "flush" is used with respect to surface 116 not in the sense of planarity, but in the sense of substantially conforming to the shape thereof.

Figure 7A:
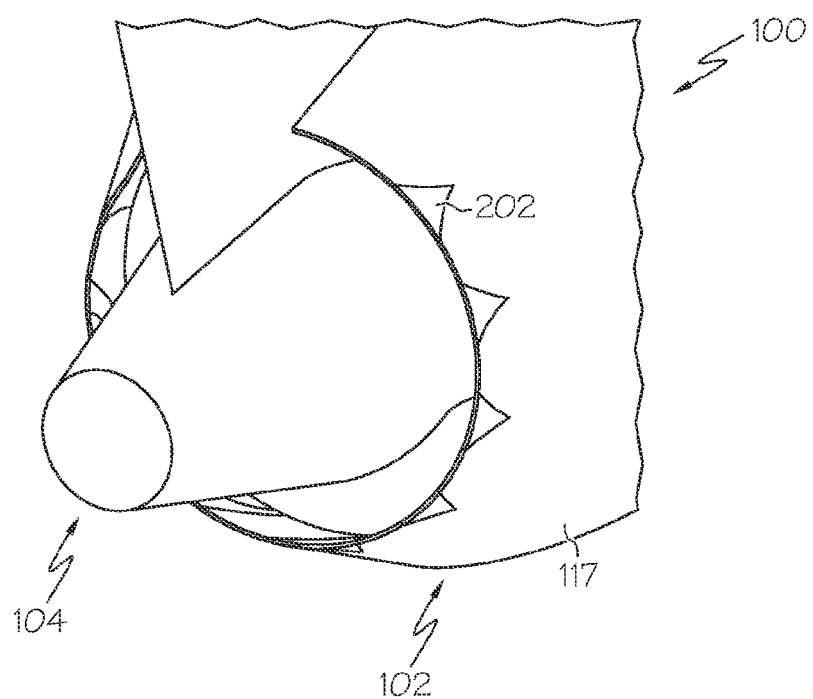
FIG. 7A is an isometric view of a nozzle geometry with stowed swirl vanes in accordance with an alternate embodiment.
Figure 7B:
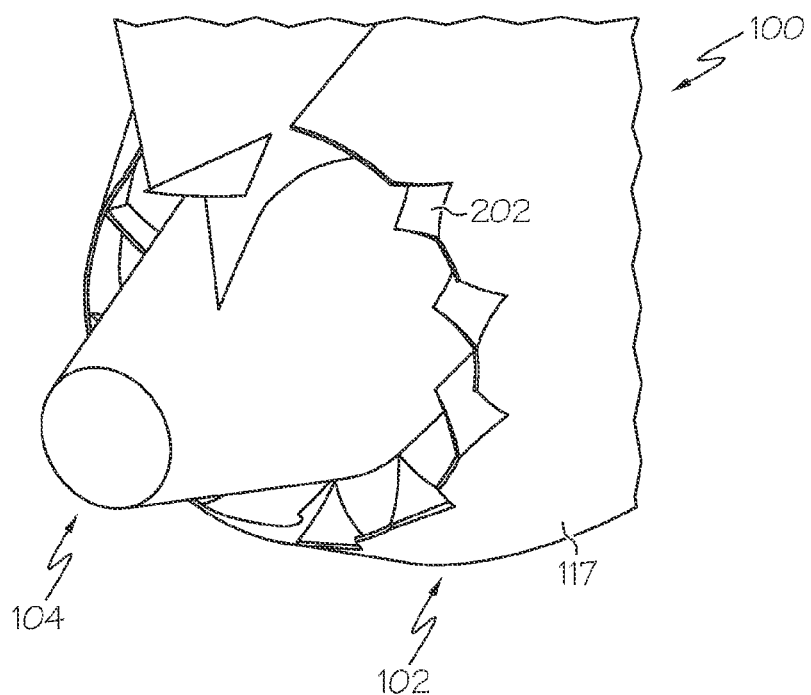
FIG. 7B is an isometric view of the nozzle of FIG. 7 with deployed swirl vanes.

FIGS. 7A and 7B depict isometric views of an alternate nozzle geometry in accordance with another embodiment. Specifically, FIG. 7A depicts a non-deployed state, and FIG. 7B depicts a deployed state, of a plurality of swirl vanes 202 that are integrated into outer nozzle structure 102. That is, the thickness of each swirl vane 202 is substantially equal to the thickness of outer nozzle structure 102 toward its trailing edge, and swirl vanes are configured to deploy in such a way that a "toothed" or tabbed nozzle trailing edge is formed by the resulting cut-outs or openings.

Referring briefly again to FIG. 1, the term "thickness" as used herein refers to the distance between the inner surface 116 of outer nozzle structure 102 (the surface wetted by the exiting fluid) and the outer surface 117 of outer nozzle structure 102 in the vicinity of swirl vanes 202 (the surface wetted by the external air).

As with the embodiment illustrated in FIG. 6, the size, shape, distribution, and other features of swirl vanes 202 may vary depending upon design factors. It will be appreciated that the tabbed nozzle trailing edge illustrated in FIGS. 7A and 7B removes material from the outer diameter of outer nozzle structure 102, and thus effectively increases the exit area of the nozzle. This feature allows engine 100 to operate at its designed flow capacity and minimizes adverse conditions resulting from the reduction of flow capacity introduced by swirl. It will be appreciated that the invention is not limited to the trianguloid openings depicted in the figures. The present invention contemplates any trailing edge modification configured to regulate the effective exit area of the nozzle.

FIG. 8 presents a nozzle geometry in accordance with an alternate embodiment of the invention. As with the embodiment depicted in FIG. 7, all or a portion of swirl vanes 202 have a thickness substantially equal to the thickness of outer nozzle structure 102; however, the resulting openings (804) in which swirl vanes are stowed do not extend to the trailing edge of outer nozzle structure 102, and are separated from the trailing edge by a region 802. In such an embodiment, a portion of swirl vanes 202 may have a thickness that is less than outer nozzle structure 102 such that, when stowed, that portion of swirl vanes 202 fits within the inner wall of outer nozzle structure 102, while the remaining portion of swirl vanes 202 fits within opening 804.

Regardless of embodiment, a variety of actuation subsystems are suitable for moving the swirl vanes from a non-deployed state to a deployed state and otherwise controlling deployment. In the embodiments depicted in FIGS. 6 and 8, the swirl vanes are hingedly connected to the inner surface of the outer nozzle structure. Accordingly, in such embodiments, it is advantageous to utilize an actuation subsystem that includes components configured to rotate the swirl vanes around an axis that is non-parallel to the nozzle structure center line.

Figure 12:
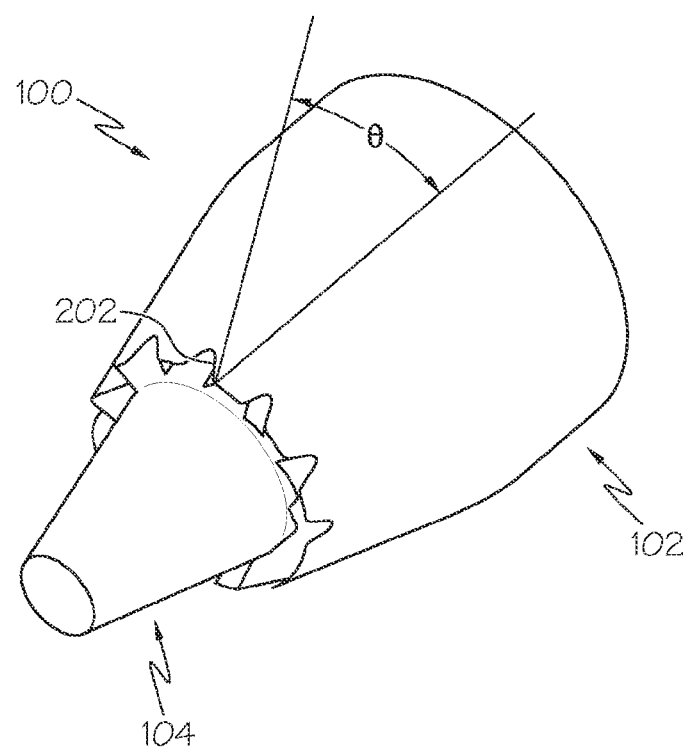
FIG. 12 is a conceptual overview of a nozzle geometry illustrating the definition of swirl angle.

In this regard, the geometry and motion of swirl vanes 202 can be characterized by an "exit swirl angle" (or simply "swirl angle") and a "vane rotation angle" (or simply "rotation angle"). Referring to the exemplary nozzle structure shown in FIG. 12, the swirl angle $\Theta$ represents the angle of the swirling fluid as it passes the trailing edge of swirl vanes 202 relative to the centerline of the nozzle structure 102, as illustrated. Stated another way, the swirl angle is the angle required to produce the tangential component of the flow that exits the nozzle. As will be appreciated, if the swirl angle were zero, the velocity of the flow exiting the nozzle would not include a significant tangential (or circumferential) component. In some embodiments, the swirl angle is between about 20-35 degrees; however, the invention is not so limited, and will generally be dictated by the architecture and operating conditions of the nozzle.

Figure 13:
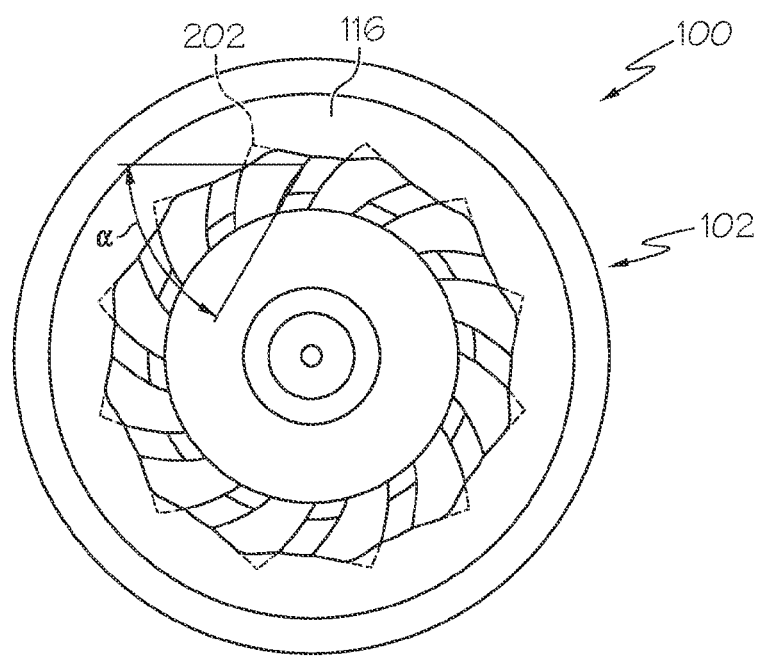
FIG. 13 is a conceptual overview of a nozzle geometry illustrating the definition of vane rotation angle.

FIG. 13 illustrates an exemplary nozzle structure wherein the swirl vanes 202 have been deployed (i.e., hingedly) through a rotation angle α. The rotation angle thus characterizes the angle of the swirl vanes 202 relative to their position in the stowed state. The rotation angle will typically have a maximum value when the swirl vanes are in their deployed state, and a minimum value in the stowed state (i.e., a binary selection of rotation angles). In some embodiments, however, the rotation angle may be specified within a continuous range to achieve a fractional level of drag performance. The maximum rotation angle, in some embodiments, ranges from 45 to 90 degrees. The invention is not so limited, however.

Figure 9:
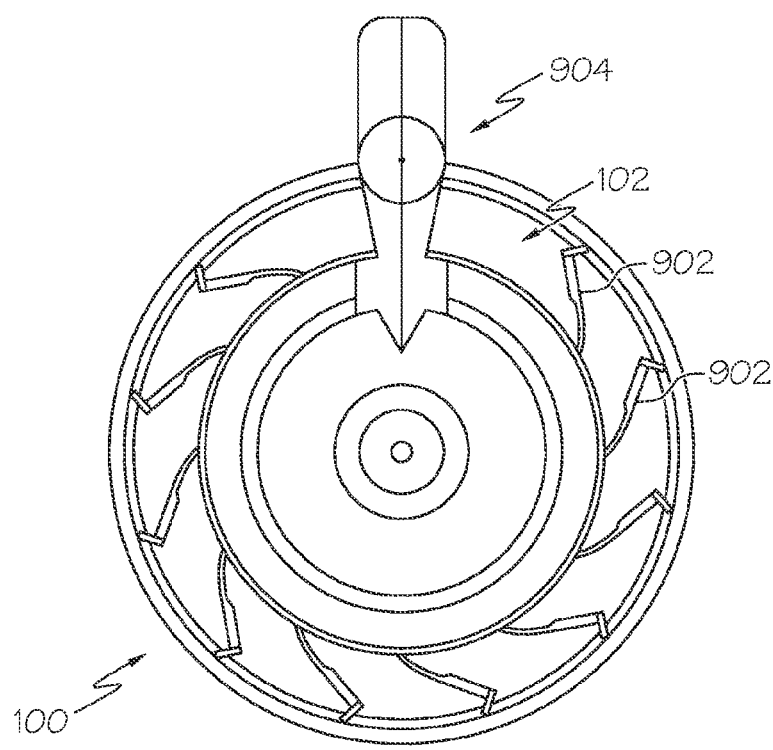
FIG. 9 an ALF view of a nozzle geometry including an actuation subsystem with stowed swirl vanes.
Figure 10:
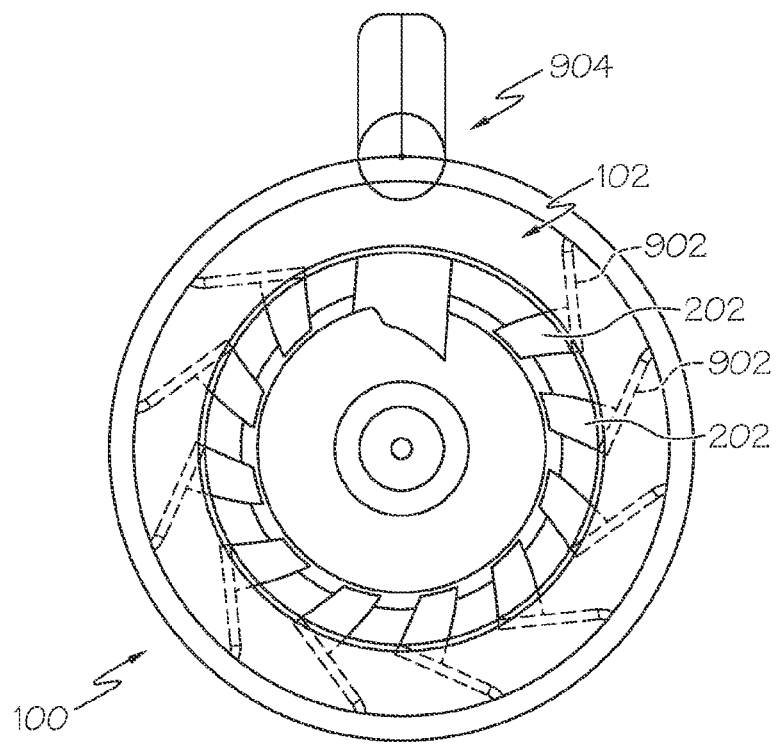
FIG. 10 is an ALF view of the nozzle geometry of FIG. 9 with deployed swirl vanes.

FIGS. 9 and 10 present respective ALF views of an engine 100 in a non-deployed state (FIG. 9) and a deployed state (FIG. 10) in accordance with one embodiment. This embodiment includes an actuation subsystem comprising a rotational actuator 904 mechanically coupled to a plurality of longitudinal pins 902, which themselves are rigidly coupled to respective swirl vanes 202 (shown in FIG. 10). Each pin 902 is preferably aligned at an angle (with respect to the nozzle centerline, which is perpendicular to the plane depicted in the drawings) that substantially corresponds to the desired exit swirl angle. Rotational actuator 904 may include a motor, servo, or the like mechanically coupled via suitable linkages to each of the pins 902, thereby allowing all of the pins 902 to be rotated in unison through a predetermined angle. It will be appreciated, however, that a variety of actuation subsystems may be employed, and the range of embodiments is not limited to those depicted in the figures.

Figure 11:
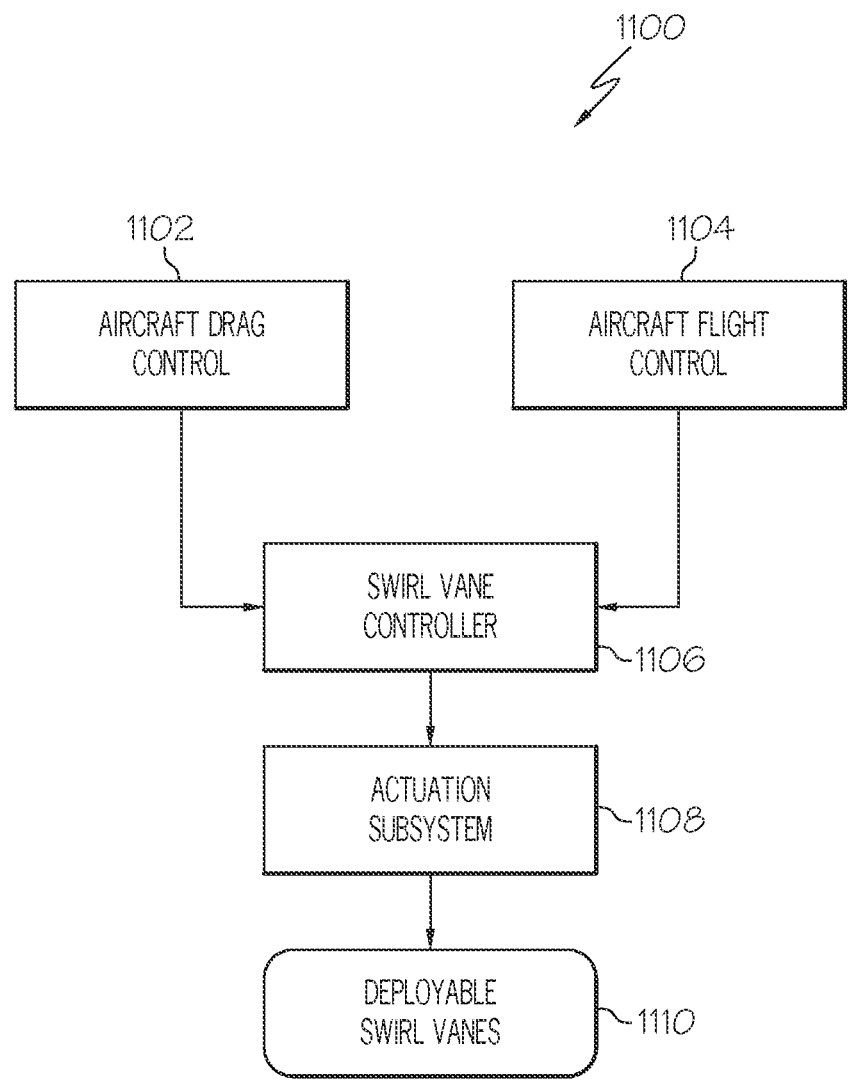
FIG. 11 is a schematic block diagram of an exemplary embodiment of an aircraft control system.

FIG. 11 is a block diagram representation of an exemplary embodiment of an aircraft control system 1100. The system 1100 may be realized as an onboard system of the host aircraft. Alternatively, some of the system 1100 (e.g., user interface features, processing components, or the like) could be implemented at a remote location such as an air traffic control station, an electronic flight bag, a portable computer, or the like. In practice, the system 1100 can be deployed with one or more processor devices, components, subsystems, or elements, as is well understood. For example, the system 1100 may be implemented using an onboard computer system, a line replaceable unit, a portable computing or memory storage device, etc. Furthermore, although the system 1100 could be deployed in conjunction with other aircraft subsystems, processing logic, software, or the like, FIG. 11 is a simplified depiction that focuses on the subject matter presented here.

The exemplary embodiment of the system 1100 generally includes, without limitation, an aircraft drag control module 1102, an aircraft flight control module 1104, a swirl vane controller 1106, an actuation subsystem 1108, and the deployable swirl vanes 1110. These elements and modules (and other elements, modules, components, and subsystems if needed or desired) are coupled together in an appropriate manner to accommodate the transfer of data, the provision of operating power, and the like, as is well understood.

Aircraft drag control module 1102 represents hardware, software, firmware, and/or processing logic that enables a user (typically a member of the flight crew) to control the drag management function of the system 1100. As described previously, deployable swirl vanes 1110 can be deployed to achieve a desired increase in drag, relative to the amount of drag experienced in a non-deployed (conventional) aircraft operation. In practice, the aircraft drag control module 1102 can be manipulated to generate drag management commands to control the deployment of swirl vanes 1110 independently or in concert with other EAB components (not illustrated).

Aircraft flight control module 1104 represents hardware, software, firmware, and/or processing logic that enables a user (typically a member of the flight crew) to navigate and maneuver the host aircraft during taxi and flight operations. The deployable swirl vanes 1110 are typically in a stowed state (non-deployed) for most of the flight, especially while cruising. However, the deployable swirl vanes 1110 can be actuated as needed into deflected states to assist with various flight maneuvers such as, without limitation, roll, yaw, and pitch maneuvers.

Swirl vane controller 1106 represents hardware, software, firmware, and/or processing logic that cooperates with the aircraft drag control module 1102 and aircraft flight control module 1104 for purposes of processing user inputs. In certain embodiments, swirl vane controller 1106 may be implemented as part of the aircraft drag control module 1102 and/or as part of the aircraft flight control module 1104. In operation, the swirl vane controller 1106 receives drag control and/or flight control commands from the respective modules 1102 and 1104, processes the control commands as needed, and generates actuation commands intended to deploy, activate, or adjust the states of deployable swirl vanes 1110.

Actuation subsystem 1108 represents hardware, software, firmware, and/or processing logic that is responsible for actuating deployable swirl vanes 1110 in accordance with the user input, the control commands, and the actuation commands. In practice, the actuation subsystem 1108 may include electromechanical actuators (e.g., solenoids), mechanical linkages, hinges, gears, pushrods, motors, servos, steppers, linear actuators, pneumatic lines, valves, and/or other devices, components, and elements that facilitate deployment and stowing of deployable swirl vanes 1110.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft control structure comprising:
an engine nacelle comprising a downstream end, the engine nacelle comprising a nozzle structure defining a flow path and configured to exhaust a swirling fluid stream at a nozzle exit, the nozzle structure having an inner surface;
a plurality of swirl vanes coupled to the nozzle structure, each having a generally airfoil shape, the plurality of swirl vanes movable relative to the nozzle structure between a deployed state and a non-deployed state, the plurality of swirl vanes cerate with a portion of the nozzle structure to define an outer surface of the nozzle structure in the non-deployed state; and an actuation subsystem configured to cause the plurality of swirl vanes to move from the deployed state to the non-deployed state;

wherein, in the non-deployed state, the plurality of swirl vanes are substantially flush with the inner surface of the nozzle structure;

wherein, in the deployed state, the plurality of swirl vanes extend radially substantially across the flow path, produce the swirling fluid stream and define a plurality of cut-outs through the nozzle structure; and wherein the plurality of swirl vanes are deployed to assist in drag management of the aircraft and an exit area of the nozzle exit is greater in the deployed state than in the non-deployed state.

2. The aircraft control structure of claim 1, wherein the nozzle structure is part of a bypass nozzle of a turbofan engine.

3. The aircraft control structure of claim 1, wherein the plurality of swirl vanes are hingedly coupled to the nozzle structure at a non-zero angle with respect to a centerline of the nozzle structure.

4. The aircraft control structure of claim 1, wherein the swirl vanes are incorporated into the nozzle structure such that at least a portion of each swirl vane has a thickness substantially equal to the nozzle structure.

5. A drag management system for an aircraft having a turbofan engine comprising an engine nacelle comprising a downstream end, the engine nacelle comprising a nozzle structure defining a flow path, the system comprising:

a plurality of swirl vanes coupled to the nozzle structure configured to exhaust a swirling fluid stream at a nozzle exit, the plurality of swirl vanes being generally airfoil shaped and movable between a deployed state and a non-deployed state, the plurality of swirl vanes cooperate with a portion of the nozzle structure to define an outer surface of the nozzle structure in the non-deployed state, the plurality of swirl vanes define a plurality of cut-outs through the nozzle structure in the deployed state, and in the deployed state, the plurality of swirl vanes extend radially substantially across the flow path; and an actuation subsystem mechanically coupled to the plurality of swirl vanes and that moves the plurality of swirl vanes from the non-deployed state and the deployed state such that the plurality of swirl vanes assist in drag management of the aircraft;

wherein the plurality of swirl vanes are configured to seat substantially flush with an inner surface of the nozzle structure when in the non-deployed state and at least a portion of each swirl vane has a thickness substantially equal to the nozzle structure and an exit area of the nozzle exit is greater in the deployed state Man in the non-deployed state.

6. The drag management system of claim 5, wherein the nozzle structure is part of a bypass nozzle of the turbofan engine.

7. The drag management system of claim 5, further including an inner nozzle structure, and wherein, while in the deployed state, the plurality of swirl vanes make contact with the inner nozzle structure.

8. The drag management system of claim 5, wherein the plurality of swirl vanes are hingedly coupled to the nozzle structure at a non-zero angle with respect to a centerline of the nozzle structure.

9. The drag management system of claim 5, wherein the swirl vanes are incorporated into an aft edge of the nozzle structure such that the aft edge has a tabbed structure when in the deployed state.

10. A method of providing drag management for an aircraft having a turbofan engine comprising an engine nacelle comprising a downstream end, the engine nacelle comprising a nozzle structure defining a flow path, the method comprising:

providing a plurality of swirl vanes coupled to nozzle structure such that, in a non-deployed state, the plurality of swirl vanes are substantially flush with an inner surface of the nozzle structure and have a generally airfoil shape, the plurality of swirl vanes cooperating with a portion of the nozzle structure to define an outer surface of the nozzle structure in the non-deployed state; and moving the plurality of swirl vanes from the non-deployed state to a deployed state, the plurality of swirl vanes extending radially substantially across the flow path and defining a plurality of cut-outs through the nozzle structure in the deployed state such that the plurality of swirl vanes produce a swirling fluid stream at a nozzle exit to assist in drag management of the aircraft and an exit area of the nozzle exit is greater in the deployed state than in the non-deployed state.

11. The method of claim 10, wherein the plurality of swirl vanes move to the deployed state such that the plurality of swirl vanes make contact with an inner nozzle structure that is provided within the nozzle structure.

\* \* \* \* \*